(12) United States Patent
Bradley et al.

(10) Patent No.: US 7,981,288 B2
(45) Date of Patent: Jul. 19, 2011

(54) PULSE RESONATING DEVICE

(75) Inventors: Wilson E. Bradley, Naples, FL (US);
John W. Lane, Finksburg, MD (US)

(73) Assignee: Evapco, Inc., Taneytown, MD (US)

( * ) Notice: Subject to any disclaimer, the term of this patent is extended or adjusted under 35 U.S.C. 154(b) by 1331 days.

(21) Appl. No.: 11/283,655

(22) Filed: Nov. 21, 2005

(65) Prior Publication Data

US 2007/0114164 A1 May 24, 2007

(51) Int. Cl.
*B01D 17/12* (2006.01)
*C02F 1/48* (2006.01)

(52) U.S. Cl. .............. 210/222; 210/243; 210/748.01; 210/143; 204/660; 204/661

(58) Field of Classification Search .............. 210/222, 210/223, 695, 143, 243, 748.01; 204/554, 204/555, 660, 661
See application file for complete search history.

(56) References Cited

U.S. PATENT DOCUMENTS

| | | | |
|---|---|---|---|
| 568,179 A * | 9/1896 | Tesla | 307/110 |
| 3,637,134 A | 1/1972 | Nelson | |
| 3,954,611 A | 5/1976 | Reedy | |
| 3,958,883 A | 5/1976 | Turner | |
| 4,579,694 A | 4/1986 | Bradley, Jr. | |
| 4,938,875 A | 7/1990 | Niessen | |
| 5,074,998 A * | 12/1991 | De Baat Doelman | 210/97 |
| 5,106,491 A | 4/1992 | Schulze et al. | |
| 5,114,571 A | 5/1992 | Pier et al. | |
| 5,145,585 A | 9/1992 | Coke | |
| 5,171,431 A * | 12/1992 | Schulte | 210/94 |
| 5,224,604 A | 7/1993 | Duczemal et al. | |
| 5,304,302 A | 4/1994 | Bossert | |
| 5,443,719 A | 8/1995 | Johnson et al. | |
| 5,480,557 A | 1/1996 | Kawasaki et al. | |
| 5,514,283 A * | 5/1996 | Stefanini | 210/695 |
| 5,527,426 A | 6/1996 | Marwah et al. | |
| 5,540,835 A | 7/1996 | Sanderson | |
| 5,635,068 A | 6/1997 | Marandi | |
| 5,660,723 A | 8/1997 | Sanderson | |
| 5,670,041 A | 9/1997 | Cho et al. | |

(Continued)

OTHER PUBLICATIONS

International Search Report corresponding to PCT/US2006/38895; Aug. 27, 2007.

*Primary Examiner* — Tony G Soohoo
*Assistant Examiner* — David C Mellon
(74) *Attorney, Agent, or Firm* — Whiteford, Taylor & Preston, LLP; Peter J. Davis

(57) ABSTRACT

A fluid treatment device including a source of electrical voltage having a first and second terminal, a pulse generator connected to the first terminal and the second terminal and outputting a pulsed voltage wave signal between a third terminal and a fourth terminal, at least one coil positioned adjacent at least one fluid conduit, being electrically connected to the third and fourth terminals and at least one capacitor also being electrically connected to the third and fourth terminals to form a first circuit with an inductance L, a capacitance C and a resonant frequency. The pulse generator is arranged to generate a pulsed voltage wave with a frequency approximately equal to the resonant frequency. A further circuit element is arranged to cause the voltage pulse reaching the coil to repeatedly, alternate between a period of pulsed voltage at the frequency and a period of zero voltage, with each period extending for a time in a range of approximately 2 to 33 milliseconds.

3 Claims, 2 Drawing Sheets

U.S. PATENT DOCUMENTS

| | | | |
|---|---|---|---|
| 5,683,586 | A | 11/1997 | Harcourt et al. |
| 5,702,600 | A | 12/1997 | Pandolfo |
| 5,725,778 | A | 3/1998 | Cho et al. |
| 5,728,303 | A | 3/1998 | Johnson |
| 5,738,766 | A | 4/1998 | Jefferson |
| 6,063,267 | A | 5/2000 | Crewson et al. |
| 6,063,287 | A | 5/2000 | Smith et al. |
| 6,146,526 | A | 11/2000 | Pandolfo |
| 6,355,178 | B1 | 3/2002 | Couture et al. |
| 6,506,299 | B1 | 1/2003 | Pandolfo |
| 6,641,739 | B2 | 11/2003 | Dresty, Jr. et al. |
| 6,706,170 | B1 | 3/2004 | De Baat Doelman |
| 6,743,365 | B1 | 6/2004 | Marlow |
| 6,875,360 | B2 * | 4/2005 | Allen et al. .......... 210/695 |
| 7,217,368 | B2 | 5/2007 | Lane |
| 2002/0060918 | A1 * | 5/2002 | Drobnik .......... 363/68 |
| 2005/0000811 | A1 | 1/2005 | Luka |
| 2006/0124557 | A1 | 6/2006 | Wittmer |
| 2007/0051685 | A1 | 3/2007 | Wittmer |
| 2007/0256967 | A1 | 11/2007 | Lane |

* cited by examiner

PULSE RESONATING DEVICE

BACKGROUND OF THE INVENTION

The present invention relates to devices for treating fluids, such as water, and more particularly, to fluid treatment devices which are powered to provide electrical and magnetic fields in the fluid.

Fluid treatment with DC-powered solenoid coils has been used for many years. Such an arrangement is shown in U.S. Pat. No. 4,938,875. The DC power can be provided by a DC source (battery) or a rectified AC source. For example, U.S. Pat. Nos. 5,702,600; 6,063,287 and 6,146,526 have modified the AC method by using only a rectified half-wave to generate the DC power (without a smoothing power capacitor) and letting the coils ring with the current closed off for the second half wave. During the no-current period, the coils will ring at their resonant frequency (which can be modified by the addition of a small amount of capacitance) and emit a high frequency field into the fluid to be treated. In the '600 patent, a diode is used to rectify the wave and in the '287 patent, a triode is used to rectify the wave. The coils are energized at a line frequency of 50 or 60 Hz, and not at a natural resonant frequency of the coil or the circuit.

U.S. Pat. No. 5,725,778 discloses the use of a square wave generator with either a fixed frequency (500 Hz) or a sweep frequency (1 KHz to 3 KHz), neither of which is at the natural resonant frequency of the coil or the circuit.

Exciting or pulsing a coil at its resonant frequency, or the resonant frequency of the LC circuit it is a part of, is known, particularly in the field of inductive heating, and an exemplary patent using this arrangement is U.S. Pat. No. 3,958,883.

SUMMARY OF THE INVENTION

The present invention provides a fluid treatment device which delivers a high frequency electromagnetic signal to the fluid in a conduit. One or more electromagnetic field generators, which may be in the form of low inductance coils, are positioned adjacent to the conduit, such as by being wound on the conduit. The coils have a combined inductance of L and a capacitor is supplied with a capacitance of C which is connected across the end terminals of the coil(s) to form a first circuit. This first circuit will have a determinable resonant frequency depending on the inductance of the coils, the capacitance of the capacitors and mutual inductance and capacitance of the components in the circuit and their placement relative to one another. This resonant frequency is generally determined from the formula $1/(2\pi\sqrt{(LC)})$. A pulsed voltage, such as a square wave, is applied to the first circuit at the same resonant frequency, thereby causing the coil(s)-capacitor combination to resonate generating strong electromagnetic fields with minimal energy.

Several permutations of this basic arrangement may be used for a particular fluid.

1. Two or more coils may be used, wired either in series or in parallel.
2. When two or more coils are used, they may be wired or wound such that the fields generated at one coil are in opposition with one or more of the remaining coils.
3. Each coil may be divided into two or more parts, and the parts of two or more coils may be arranged in various alternating arrangements.
4. The pulsed voltage generator may be cycled on and off intermittently, such as in the range of approximately every 2 to 33 mSec, or within a range of approximately every 8 to 11 mSec, to generate intermittent pulsing.
5. The pulsed voltage generator may be cycled on and off at different times, and at varying times, as desired, and with the on and off periods being the same or different.
6. The particular resonant frequency of the coil(s)-capacitor circuit may be adjusted using trimming capacitors to generate any desired frequency between 1 Hz and the natural resonant frequency of the coils. For example, a frequency range of approximately 10,000 Hz to 100,000 Hz may be selected. When low inductor coils are used, a relatively low voltage will result in high current and strong fields. Also, with a low induction coil, a very broad spectrum of resonant ring frequencies is available since the natural resonant frequency due to the coil's parasitic capacitance is quite high.
7. The pulse generator may be powered by a DC voltage that can be supplied by various different arrangements. For example, a DC voltage may be supplied from a DC source, such as a battery, or may be supplied from a rectified AC voltage source. A transformer may be used with the AC voltage source to modify the voltage, current, or both, from that supplied from the AC voltage source, such as a commercial power line.

In an embodiment, a fluid treatment device is provided including a source of electrical voltage, a pulse generator connected to the source of electrical voltage at a first terminal and a second terminal and outputting a pulsed voltage signal between a third terminal and a fourth terminal. A first coil is positioned adjacent to a first fluid conduit and is electrically connected to the third terminal and fourth terminals to form a first circuit with an inductance L1. A first capacitor having a capacitance C1 is connected across the terminals of the first coil in the first circuit. The pulse generator is arranged to generate a pulsed voltage wave with a frequency approximately equal to the resonant frequency of the inductor-capacitor circuit, namely, at approximately $1/(2\pi\sqrt{(L1C1)})$. A circuit element is arranged to cause the voltage pulse reaching the coil to repeatedly, alternate between a period of pulsed voltage at the frequency and a period of zero voltage, with each period extending for a time in a range of approximately 2 to 33 milliseconds.

The fluid treatment device of the present invention may also include a second set of coils, and may be of the types described in U.S. Pat. Nos. 4,938,875, 5,702,600, 6,063,287 and 6,146,526 listed above, or of the type described in co-pending U.S. patent application entitled "Full wave rectified power water treatment device" filed Oct. 11, 2005. The disclosure of these issued patents and the pending patent application are incorporated herein by reference.

These and other features and advantages of the present invention will become apparent upon a reading of the detailed description and a review of the accompanying drawings. Specific embodiments of the present invention are described herein. The present invention is not intended to be limited to only these embodiments. Changes and modifications can be made to the described embodiments and yet fall within the scope of the present invention.

DETAILED DESCRIPTION OF THE PREFERRED EMBODIMENTS

The present invention relates to fluid treatment devices which can be used in a wide variety of applications. In an embodiment, the fluid treatment device could be used in an environment such as an evaporative cooler in which water is recirculated through the cooler, and is subject to scaling and developing microorganisms. Other types of environments are contemplated for use of this device as well, such as heating systems. In order to provide a description of an embodiment of the invention, the fluid treatment device is discussed in terms of being used with one or more fluid conduits, it being understood that the conduits could be used to carry heating or cooling water, or other fluids, as desired.

Figure 1:
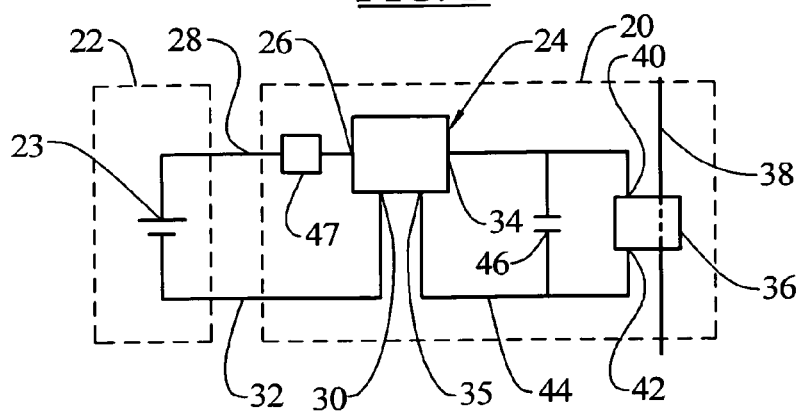
FIG. 1 is a schematic electrical diagram of an embodiment of the invention.

A particular embodiment of the invention is illustrated in FIG. 1. In this embodiment, a fluid treatment device 20 is provided for being connected to a source of electrical voltage 22. In the embodiment of FIG. 1, a particular type of electrical voltage supply is illustrated, but it should be understood that this particular type of electrical voltage supply is not required to be used with the depicted configuration of the fluid treating device 20. The particular type of electrical voltage supply illustrated in FIG. 1 includes a battery 23. Various arrangements for providing electrical voltage are described below.

The fluid treatment device 20 includes a pulse generator 24, which may be in the form of a square wave generator, or a device for generating wave forms other than square waves. The pulse generator 24 has a first terminal 26 connected to a first voltage line 28 of the voltage source 22 and a second terminal 30 connected to a second voltage line 32 of the voltage source. The pulse generator 24 has a third terminal 34 and a fourth terminal 35 where it outputs a pulsed voltage signal. In some arrangements, the second terminal 30 and the fourth terminal 35 may be at the same potential or may be one and the same.

The pulse generator 24 may be configured in numerous different fashions, as is known in the art, including utilizing individual circuitry components, such as resistors, capacitors and comparators, or may utilize programmable integrated circuits, as is known.

The fluid treatment device 20 also includes a first electromagnetic force (EMF) generator which may be in the form of a coil 36 wrapped around or positioned adjacent a first fluid conduit 38. The first coil 36 has a first end 40 electrically connected to the third terminal 34 and a second end 42 electrically connected to the fourth terminal 35 to form a first circuit 44 with an inductance L1. A first capacitor 46 having a capacitance C1 is connected across the ends 40, 42 of the first coil 36 in the first circuit 44, that is, to terminals 34 and 35. The capacitor 46 may be a single capacitor, or may be multiple capacitors, including trimming capacitors that may be adjustable. The capacitance of the circuit 44 may be adjusted to provide a resonant frequency of between 10,000 and 100,000 Hz. The pulse generator 24 is configured and arranged to generate a pulsed voltage wave between the third and fourth terminals 34, 35 with a frequency approximately equal to the resonant frequency of the circuit, that is, approximately $1/(2\pi\sqrt{(LC)})$ where L is the total inductance of the circuit and C is the total capacitance of the circuit. The resonant frequency of the circuit may be determined by empirical testing, such as by using an oscilloscope, rather than calculating the resonant frequency with a formula. This will permit a closer determination of the resonant frequency since some of the circuit elements, and the wiring itself, may affect either the inductance or capacitance of the circuit. The second 30 and fourth 35 terminals may be at the same potential, such as at ground when the voltage supplied to the pulse generator 24 is DC voltage, or the two terminals may be at different potentials at different points in time.

The pulse generator 24, or its output, may be cycled on and off intermittently by a circuit element 47, such as in the range of approximately every 2 to 33 mSec, or within a range of approximately every 8 to 11 mSec, to provide the first coil 36 with intermittent periods of pulses (on) and no pulses (off). The circuit element 47 is shown in FIG. 1 to be placed between the source of electrical voltage 22 and the pulse generator 24, and in FIG. 2 it is shown to be placed between the pulse generator 24 and the first coil 36. When the circuit element is placed in the circuit as shown in FIG. 1, and when the source of electrical voltage 22 is an AC power supply, the circuit element may be a rectifying device, such as a diode, which will in effect turn off the power to the pulse generator 24 every other half cycle of the current cycle. The on and off periods provided by the circuit element 47 may be the same as each other, or different in length from each other, and each of the periods may remain at a constant length of time during the operation of the first coil 36, or may vary over time. A square wave generator may be provided as the pulse generator 24 which includes a programmable integrated circuit (PIC), and this PIC may be used to turn the output of the pulse generator on and off at selected times, and indicated in FIG. 3 where the circuit element 47 is located within the pulse generator 24.

Figure 2:
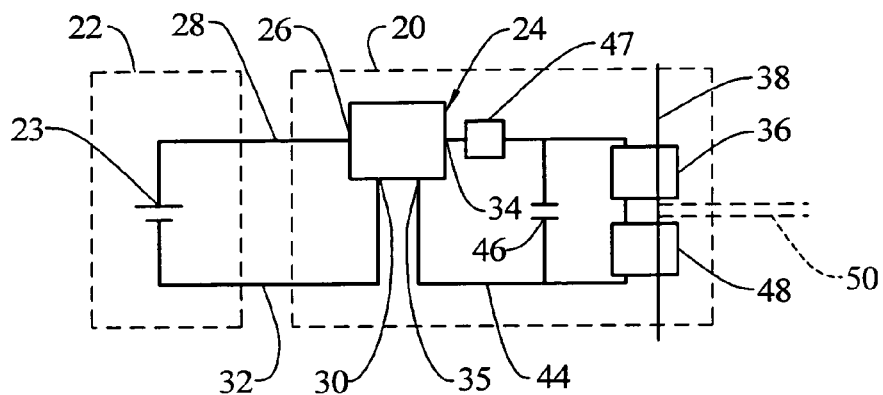
FIG. 2 is a schematic electrical diagram of a second embodiment of the invention.

FIG. 2 illustrates another embodiment of the invention in which all components are the same as those illustrated in FIG. 1, except that a second EMF generator in the form of a second coil 48 with an inductance of L2, is connected in series with the first coil 36. The first coil 36 may be fabricated in two parts, with the second part comprising the second coil 48, or a separate coil may be supplied as the second coil. In this arrangement, both coils contribute to the total inductance L of the first circuit 44 via their own inductance in a series combination in addition to a mutual inductance when the two coils are placed relatively near one another. Depending on the fields desired to be generated, the first 36 and second 48 coils may be overlapping completely, or to a limited extent, they may be abutting (with only the thickness of the insulation of the coils separating the wires of the adjacent coils), or they may be spaced apart, for example, up to 0.75 inches apart, to still provide an interaction between the fields generated by each of the coils. The pulse generator 24 is configured and arranged to generate a pulsed voltage wave between the third and fourth terminals 34 with a frequency approximately equal to the resonant frequency of this circuit having a total inductance L and a total capacitance C. In this circuit, the capacitor 46 is connected across the ends of the series connection of the two coils 36, 48, that is, at terminals 34 and 35.

The first 36 and second 48 coils may both be wound on the first fluid conduit 38, or the second coil may be wound on a second fluid conduit 50. When the first 36 and second 48 coils are both wound on the first fluid conduit 38, the coils may be wound or wired so as to produce electromagnetic fields that are in the same direction or in opposite directions, depending on the effect that is to be produced on the fluid flowing through the conduit 38. That is, the winding (wrapping direction) of the coils 36, 48 on the conduit 38 may be done in the same or opposite directions, or the wiring of the coils (position of the first and second ends, and thus determining the direction of current flow) may be done in the same or opposite directions.

Figure 3:
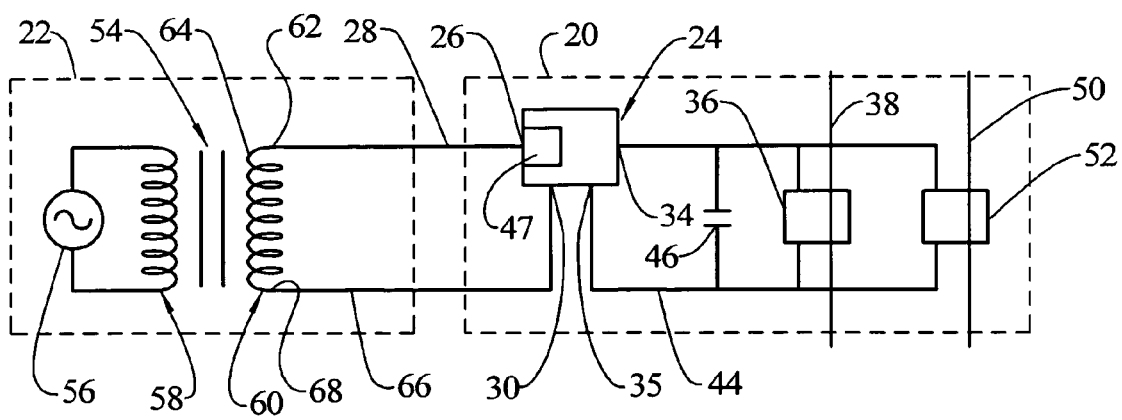
FIG. 3 is a schematic electrical diagram of a third embodiment of the invention.

FIG. 3 illustrates another embodiment of the invention in which all components are the same as those illustrated in FIG. 1, except that a second EMF generator in the form of a second coil 52 with an inductance of L2 is connected in parallel with the first coil 36, and a particular type of voltage supply is illustrated. In this arrangement, both coils contribute to the total inductance L of the first circuit 44 via their own inductance in a parallel combination in addition to a mutual inductance when the two coils are placed relatively near one another. Depending on the fields desired to be generated, the first 36 and second 52 coils may be overlapping completely, or to a limited extent, they may be abutting (with only the thickness of the insulation of the coils separating the wires of the adjacent coils), or they may be spaced apart, for example, up to 0.75 inches apart, to still provide an interaction between the fields generated by each of the coils. The pulse generator 24 is configured and arranged to generate a pulsed voltage wave between the third 34 and fourth 35 terminals with a frequency approximately equal to the resonant frequency of this circuit having a total inductance L and a total capacitance C. In this circuit, the capacitor 46 is connected across the ends of the parallel connection of the two coils 36, 52, that is, at terminals 34 and 35.

The first 36 and second 52 coils may both be positioned adjacent to the first fluid conduit 38 (as indicated by the dotted connection of conduits 38 and 50, rendering them into a single conduit), or the second coil may be positioned adjacent to the second fluid conduit 50 (as a separate and independent conduit). As noted above, when the first 36 and second 52 coils are both positioned adjacent to the first fluid conduit 38, they may be arranged such that they produce electromagnetic fields that are in the same direction or in opposite directions, depending on the effect that is to be produced on the fluid flowing through the conduit 38. That is, for example, the winding (wrapping direction) of the coils 36, 52 on the conduit 38 may be done in the same or opposite directions, or the wiring of the coils (position of the first and second ends, and thus determining the direction of current flow) may be done in the same or opposite directions.

In the embodiment of FIG. 3, a particular type of power supply is illustrated, but it should be understood that this particular type of power supply is not required to be used with the parallel coil configuration of the fluid treating device 20. The particular type of power supply illustrated in FIG. 3 includes a transformer 54 connected to a source of AC power 56 at a primary transformer coil 58 to provide a desired maximum voltage and a desired alternating current flow at a secondary transformer coil 60. A first electrical conductor 62 is electrically connected to a first point 64 on the secondary coil 60. A second electrical conductor 66 is electrically connected to a second point 68 on the secondary coil 60 spaced from the first point 64. The AC wave form may be changed to a DC wave form if needed, for example with a rectifying means provided within the pulse generator 24, or by the addition of other well known circuit elements between the secondary transformer coil 60 and the pulse generator.

Figure 4:
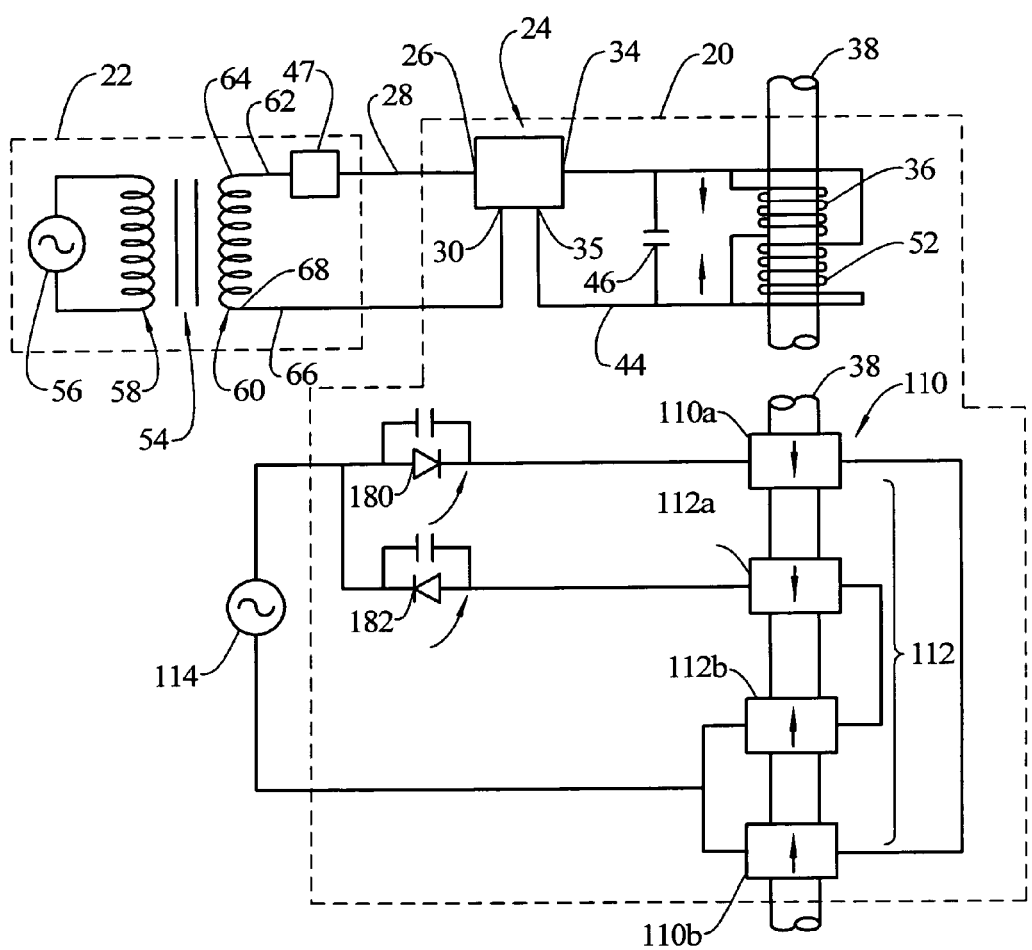
FIG. 4 is a schematic electrical diagram of a fourth embodiment of the invention.

As illustrated schematically in FIG. 4, the fluid treatment device 20 of the present invention may also include a second set of EMF generators, which may be in the form of coils 110, 112, and may be of the types described in U.S. Pat. Nos. 4,938,875, 5,702,600, 6,063,287 and 6,146,526 listed above, or of the type described in co-pending U.S. patent application entitled "Full wave rectified power water treatment device" filed Oct. 11, 2005. The disclosure of these issued patents and the pending patent application are incorporated herein by reference.

In the arrangement of FIG. 4, the fluid treatment device has been expanded to include not only the first set of coils 36, 52, but also the second set of coils 110, 112. Here the first set of coils 36, 52 are illustrated as a pair of coils wrapped around the conduit 38 such that they generate opposing fields (as indicated by the arrows). The second set of coils 110, 112 are illustrated as a pair of coils formed in two parts with the first 110a and second 110b parts of the first coil spaced apart and the first 112a and second 112b parts of the second coil interposed. The two parts of the two coils 110, 112 are wired and wound such that the first part of each coil generates a field in a direction opposite to a field direction generated in the second part of each coil, as indicated by the arrows. An AC power supply 114, which may be the same or different than the AC power supply provided for the first set of coils 36, 52, is provided to energize the coils 110, 112, with oppositely arranged diodes 180, 182 to power the first coil 110 during one half of an AC cycle and to power the other coil 112 during the other half of the AC cycle, with an abrupt cut-off of current to the coils causing the coils to ring at their resonant frequency.

Although one particular arrangement of a combination of two sets of coils is illustrated in FIG. 4, it should be understood that any of the coils and arrangements described with respect to FIGS. 1-3 could be used in conjunction with a second set of coils arranged and operated in accordance with any of the referenced patents and patent applications listed above.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim:
1. An apparatus for treating a fluid with electromagnetic fields, said apparatus comprises:
(A) a treatment zone having a conduit through which said fluid flows:
(B) an AC power supply;
(C) a signal generator having:
 (i) at least one switch;
 (ii) a first controller, said first controller operates said switch; and
 (iii) a first power source fed by said AC power supply for supplying power to said switch;
(D) at least one high frequency induction coil energized at a frequency of between 10,000 and 100,000 Hz, said high frequency induction coil surrounds a section of said conduit and provides a high frequency electromagnetic field into said treatment zone in sufficient strength and for a sufficient exposure time to treat contaminants in said fluid;
(E) a second controller, said second controller includes two diodes, each of said diodes switches an alternate half of applied supply voltage;
(F) a second power source fed by said AC power supply, said second power source includes a transformer; and
(G) at least two lower frequency induction coils energized at a frequency generated by said AC power supply, said lower frequency induction coils surround a section of said conduit and provide a lower frequency electromagnetic field in said treatment zone in sufficient strength and for sufficient exposure time to treat contaminants in said fluid.

2. The apparatus according to claim 1 wherein said lower frequency induction coils are wound and powered so that the current flowing through each lower frequency induction coil generates an axial magnetic field within said lower frequency induction coil and the direction of each of said field is opposing.

3. The apparatus according to claim 1 wherein said high frequency induction coil is coupled to at least one capacitor.

* * * * *